United States Patent [19]

Rhodes et al.

[11] Patent Number: 5,408,880

[45] Date of Patent: Apr. 25, 1995

[54] ULTRASONIC DIFFERENTIAL MEASUREMENT

[75] Inventors: George W. Rhodes, Albuquerque; Albert Migliori, Santa Fe, both of N. Mex.

[73] Assignee: Quatro Corporation, Albuquerque, N. Mex.

[21] Appl. No.: 75,120

[22] Filed: Jun. 10, 1993

[51] Int. Cl.$^6$ ............................................. G01H 13/00
[52] U.S. Cl. ............................................................. 73/579
[58] Field of Search ................. 73/579, 582, 602, 620, 73/659, 625; 364/508

[56] References Cited

U.S. PATENT DOCUMENTS 3,659,456  5/1972  Marshall ............................. 73/659
4,061,017 12/1977  Sloane ................................. 73/579

Primary Examiner—Hezron E. Williams
Assistant Examiner—Christine K. Oda
Attorney, Agent, or Firm—Ronald R. Snider

[57] ABSTRACT

A method and apparatus for ultrasonic resonance testing of an object is shown and described. Acoustic vibrations are applied to an object at a plurality of frequencies. Measurements of the object's vibrational response are made simultaneously at different locations on said object. The input frequency is stepped by using small frequency changes over a predetermined range. There is a pause interval or ring delay which permits the object to reach a steady state resonance before a measurement is taken.

6 Claims, 4 Drawing Sheets

ULTRASONIC DIFFERENTIAL MEASUREMENT

BACKGROUND OF THE INVENTION

This invention was made with government support under Contract No. W-7405-ENG-36 awarded by the U.S. Department of Energy. The government has certain rights in the invention.

1. Field of the Invention

This invention relates in general to an ultrasonic testing device and, more particularly, to the use of a plurality of piezoelectric sensors or transducer receiver assemblies in an ultrasonic resonant spectrometer to measure the ultrasonic characteristics of objects for use in testing for the presence of imperfections in vibrated objects. The plurality of measurements are compared to form a unique signature at a given set of frequencies.

2. The Prior Art

It has long been attempted to test objects for imperfections by utilizing the natural resonance of the objects when vibrated. Particularly when the objects to be tested are mass produced, such as ball bearings, where it is important to meet safety standards.

Recent efforts have been directed to measuring objects of known shape and frequency. See U.S. Pat. No. 4,976,148, incorporated herein by reference, except for column 1, lines 21 and 22.

U.S. Pat. No. 4,858,469 shows a two receiver transducer used for analysis of vibrations of timbers in response to vibrations and impact. Surface and shear vibrations are detected by detection of the first half cycle of timber vibration. The first half cycle is not a resonant response measurement and is the first response to an impact.

U.S. Pat. Nos. 4,758,964 Bittner, 4,577,500 Mishiro, 4,603,585 Atalar, 4,212,205 West, 4,858,469 Hosgood, and 4,166,393 Lindner are examples of vibration (or resonance) measurement with more than one vibration sensor.

It is an object of the present invention to provide a reliable and cost effective means for testing objects of various shapes and at numerous frequencies in order to detect imperfections.

Additional objects, advantages and novel features of the invention will be set forth in part in the description which follows, and in part will become apparent to those skilled in the art upon examination of the following, or may be learned by practice of the invention.

SUMMARY OF THE INVENTION

This invention provides for measurement of vibration of a test object by two or more measurement transducers and recording of the transducer output amplitudes at a plurality of test frequencies.

Each output transducer is connected to a receiver which provides an output at a fixed frequency and at an amplitude proportional to the vibration detected by the sensing transducer.

In the method of this invention, acoustic waves having frequencies swept over a predetermined frequency range are applied to an object. The response of the object to the acoustic waves at a plurality of sensor locations is detected. The frequency of at least one resonant response within the frequency range of each of the plurality of locations is then determined, and excitation frequency and response to the excitation frequency is recorded. Recording may be of at least one resonant response (the frequency of at least one resonant response and its magnitude).

In this apparatus and method, the resonant response may comprise an amplitude measurement as a function of frequency. Further, the resonant response may also be performed when the tested part is dry or wet. Wetting of the part may fill cracks and with some suitable liquid such as isopropanol, thereby producing a different response in the dry and wet measurements only if cracks are present.

To achieve the foregoing and other objects, and in accordance with the object of the present invention, as embodied and described herein, the apparatus of the present invention uses an ultrasonic excitation transducer and a plurality of ultrasonic detectors. The excitation transducer assembly contacts and vibrates the sample over an operative frequency range; and a plurality of receive transducer assemblies contact the sample and produce outputs which are sent as separate signals to a processor. The receive transducer assemblies derive output responses from the samples, and the excitation or drive transducer assembly excites the sample over a resonant response frequency range.

Excitation may include a series of step increases in frequency and at intervals in frequency much less than the width of the resonance and at intervals in time much less than the time required for the resonance to decay after excitation at a fixed frequency.

The receive and drive transducer assemblies may consist of the same or similar configurations, and may be any device that produces an electrical output at the frequency of vibration of the sample which is proportional to the amplitude of the vibrations in the sample. Each output signal is connected to the input of a suitable receiver that amplifies and removes noise from the signal. Output response signals (natural resonance response data) can be used to establish a standard when testing objects of the same shape. Objects known to be free of imperfections and/or of acceptable minimum imperfections can be vibrated over a specific frequency range to obtain a spectrum of resonant responses.

For large, complex or expensive objects which do not have a known intrinsic acoustic resonance, it is not economically possible to establish a standard spectrum of resonant response or rejection limits. However, an object can be tested when manufactured and again after use, to screen for imperfections occurring during use. Imperfections can be caused by external forces on the object such as minor vibrations from traffic or seismic activity, wind vibration, mechanical vibration, and other pressures exerted during use. Under these conditions, the ultrasonic testing device consists of a drive transducer, a plurality of receive transducers, a receiver, and a data collection device.

BRIEF DESCRIPTION OF THE DRAWINGS

The accompanying drawings illustrate an embodiment of the present invention and together with the description, serves to explain the principles of the invention.

DETAILED DESCRIPTION OF THE INVENTION

Figure 1:
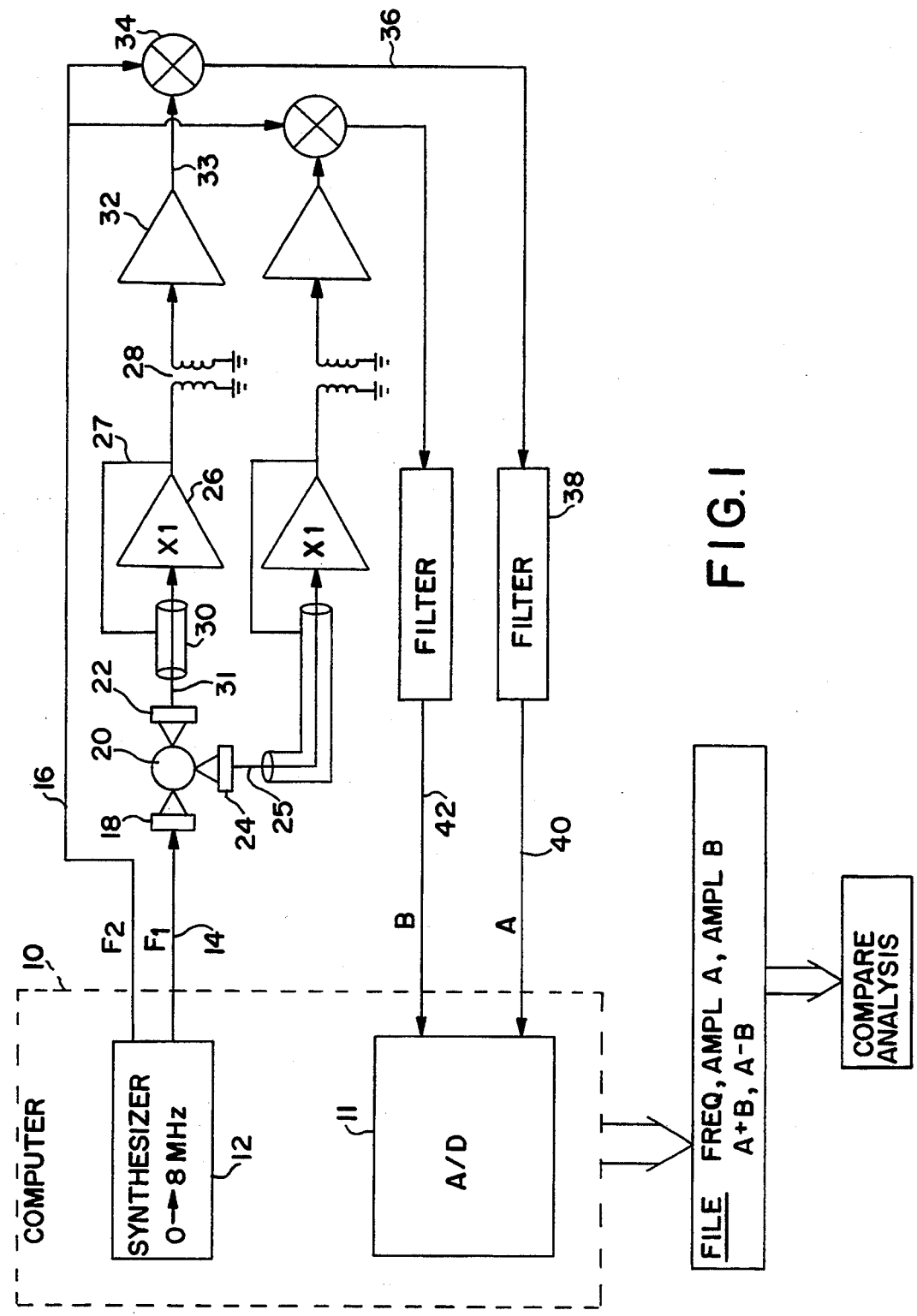
FIG. 1 shows in block-diagram form an apparatus for performing the method of the present invention.

FIG. 1 shows an apparatus for resonant ultrasound spectroscopy measurement with a plurality of sensors. Computer 10 provides for control of the synthesizer 12 and the 16 bit analog to digital converter 11 for each data input channel connected to each receiving transducer 22, 24. Transducer 22 has an output on line 31 and transducer 24 has an output on line 25.

Synthesizer 12 preferably has a frequency range from greater than 0 to 8 M Hertz. Synthesizer 12 provides two outputs which are the frequency F1 at output 14 and a second output which is the frequency F2 which is either F1 plus a constant frequency such as 1000 Hertz for heterodyne operation of the receiver, or at F1 for homodyne operation, at line 16. A first transducer 18 is excited at a frequency F1 by synthesizer 12. Transducer 18 provides ultrasonic vibration to an object to be tested 20.

The response of the object 20 is then received by two separate output transducers 22 and 24. The circuitry from the output transducer 22 and A/D converter 11 can be identical to circuitry between transducer 24 and A/D converter 11. For this reason, only the circuitry between transducer 22 and A/D converter 11 will be discussed below. The times one (×1) amplifier 26 is connected to the transducer 22, provides current for transformer 28 and has a feedback 27.

Figure 4:
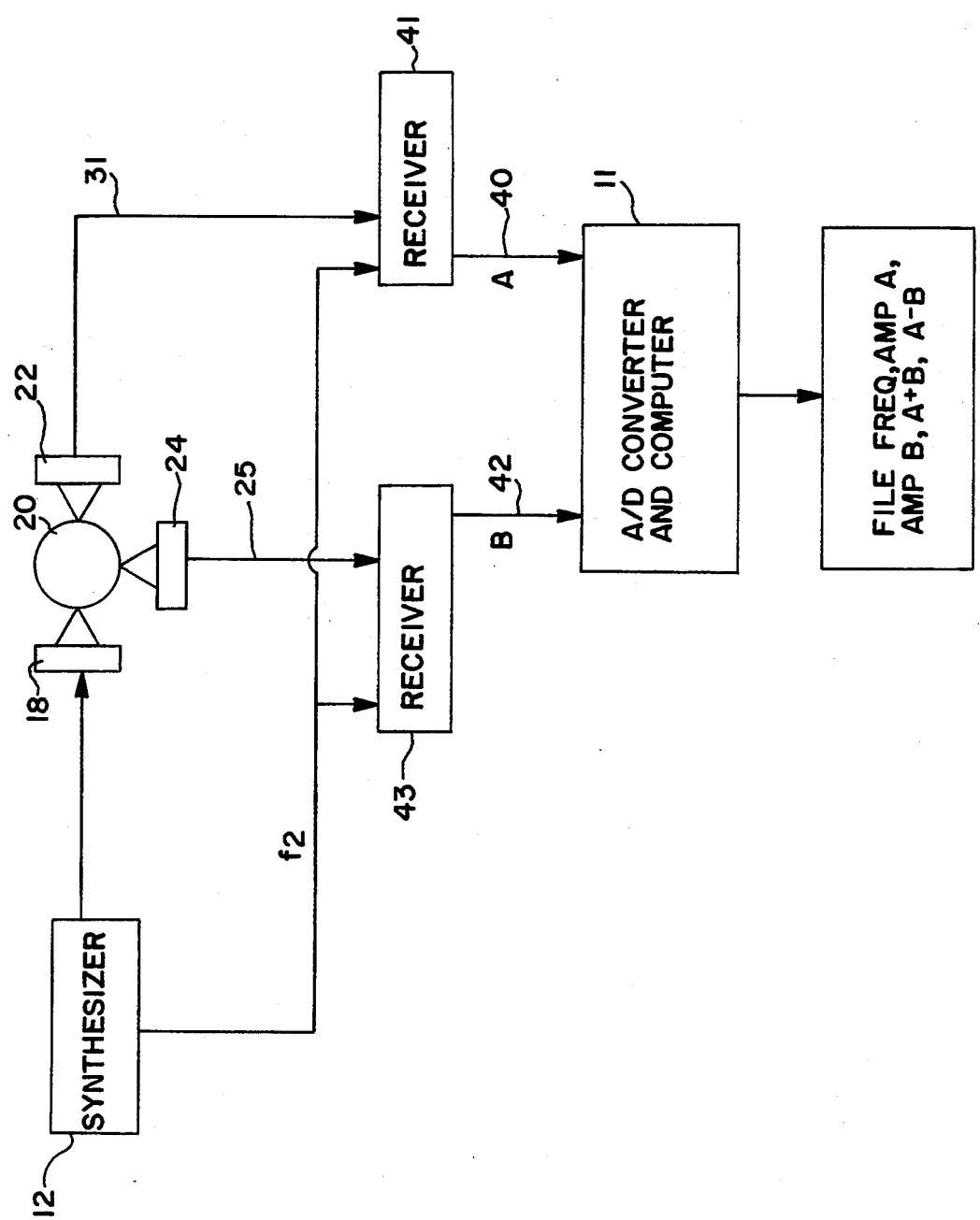
FIG. 4 shows a simplified block diagram of the apparatus of FIG. 1.

The output of transducer 22 is connected to a receiver 41 (FIG. 4), such as a Model QS-20 manufactured by Quatro Corp., although other receivers may be used. Receiver 41 is used for the purpose of providing amplification and noise rejection in the circuit between transducer 22 and A/D converter 11.

The output A (line 40) is applied to an A/D converter 11 within the computer. Typically, the A/D converter comprises a 16 bit A/D conversion for each of lines 40 and 42. The converted information is then entered into a file which consists of the measured frequency, the amplitude of A, the amplitude of B, the amplitude of A plus B, and the amplitude of A minus B. This file is then used for further analysis of the spectrum to determine characteristics of a part 20 being tested.

The computer 10 can be an IBM Personal Computer having an Intel® processor 486 operating at 33 M Hertz, although other types of computers can be used.

Synthesizer 12 associated with computer 10 is a dual digital synthesizer such as Model QS-30 manufactured by Quatro Corp. although other synthesizers may be used.

The times one (×1) amplifier 26 provides feedback to an inner coaxial cable shield 30 which surround the lead from transducer 22 to amplifier 26. Shield 30 is another grounded shield which can also be used for noise suppression. The outer surrounding coaxial cable is not shown in FIG. 1. If lead 31 is short, the shield 30 may be omitted because capacitance will not be too large. The purpose of the inner shield 30 is to provide a cancellation of capacitance of the connection 31.

The transformer 28 is a 4:1 step down transformer used for impedance matching to the input of amplifier 32. In this regard, it should be noted that the output impedance of amplifier 26 is much lower than the output impedance of transducer 22. This provides for the power gain and the necessary feedback to shield 30. The amplifier 32 may have a gain factor of 100:1 or a 40 db gain. The amplifier 26 is a broad-band amplifier having a band pass on the order of 50 M Hertz.

Figure 2:
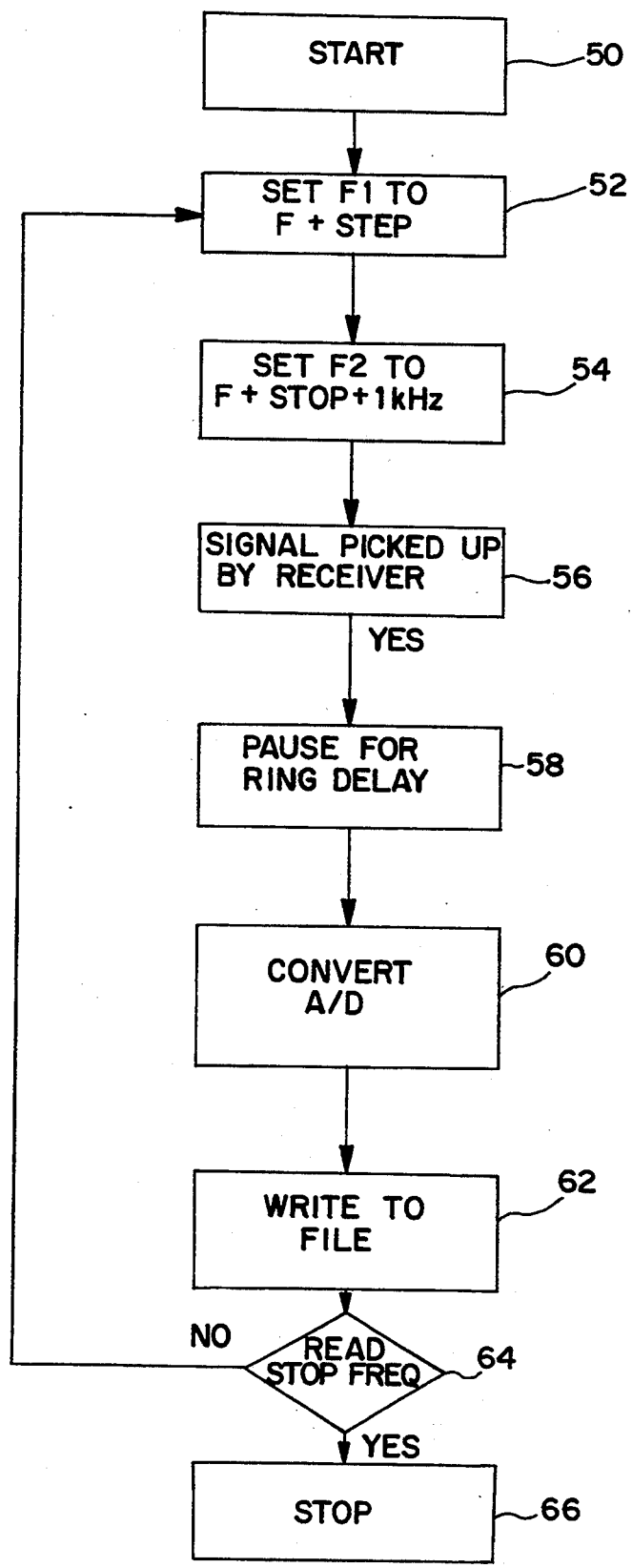
FIG. 2 shows a flow chart of the control sequence for the present invention.

Mixer 34 has an output which is a 1 K Hertz signal having a magnitude which is proportional to the magnitude of the frequency F-1 provided on line 14 from synthesizer 12. The function of the synthesizer is to provide a point-by-point multiplication of instantaneous values of inputs on lines 16 and 33. The mixer 34 also has many high frequency output components which are of no interest. The high frequency components are therefor filtered out by the low-band pass filter 38 which is connected to mixer 34 by line 36. Filter 38 serves to clean-up the signal from mixer 34 and provide a voltage on line 40 which is only the 1 K Hertz signal at an amplitude which is proportional to the amplitude of the output 31 of transducer 22. FIG. 2 is a flow diagram of the measurement steps performed by measurement of the output of either transducer 22 or transducer 24 controlled by computer 10. An initial start 50 initiates the measurement cycle, and provides initialization for the frequency F and the frequency step indicated in block 52. The frequency step may be 1 Hertz or any other frequency selected for the measurement. The frequency step is determined by determining the start frequency and the stop frequency, and dividing the frequency difference by the number of steps desired for the measurement. For instance, a measurement from a start frequency of 2 K Hertz to a stop frequency of 3 K Hertz requiring 100 steps will result in a 10 Hertz step.

Figure 3:
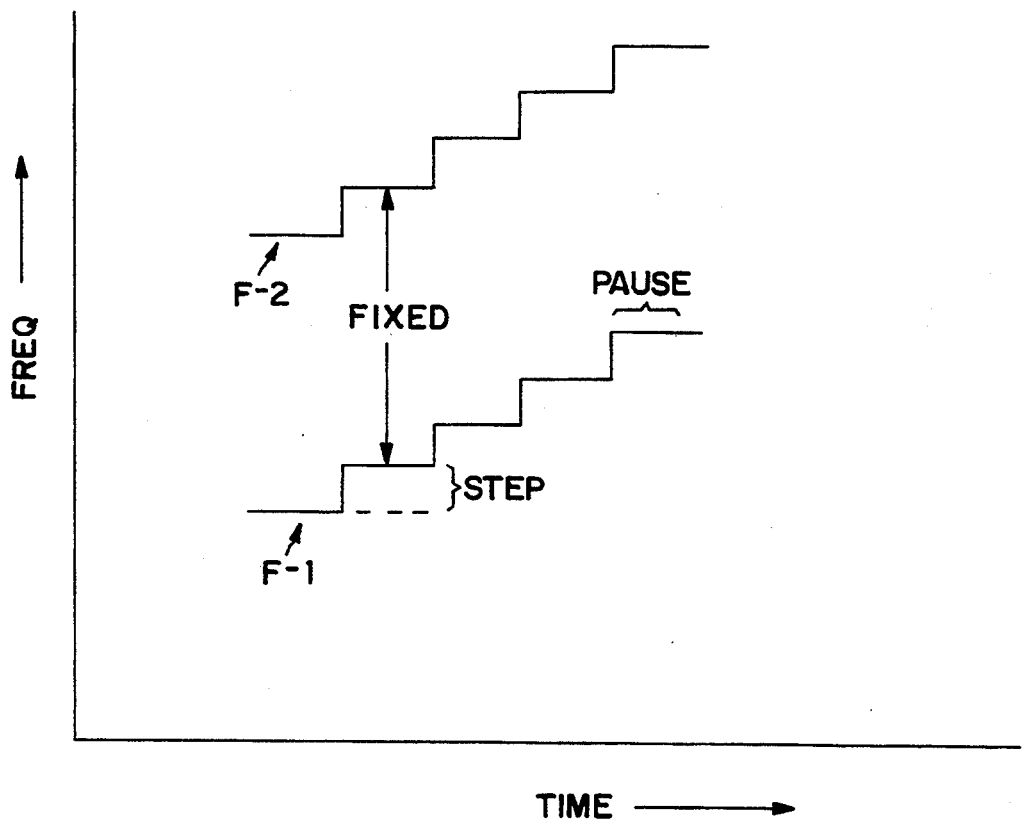
FIG. 3 shows the step-by-step increase in excitation frequency.

Once the frequency F plus step frequency is determined, the synthesizer is used to set a second frequency F2 to the value of F plus step plus 1 K Hertz (see block 54) if heterodyne operation is desired, or F1 if homodyne operation is desired. Homodyne is used below 20,000 Hertz, and heterodyne is used above 2000 Hertz. In the overlap region, either may be used. In FIG. 3 the relationship between time and frequency of F1 and F2 is shown. The step is each increase in frequency, and steps are continued until the desired frequency range is traversed.

Once a signal is picked up by the receiver (i.e. an output on line 33), as indicated at 56, there is a provided a pause for ring delay as shown at block 58. The pause for ring delay is typically 30 milliseconds, although other ring delays can be used if the object under test has resonances that are narrower than a few Hertz. The purpose of the pause is to give the object 20 an opportunity to reach its steady state magnitude in response to a steady input from transducer 18. The pause time is time after the frequency is applied and before detection is initiated.

After the ring delay is complete, analog-to-digital converter 11 provides an output that can be used by the data recording computer. The output of the A/D conversion 60 is then written to a file by the computer as shown in block 62 for the purpose of analysis of the data by another program. Data comprising the unique signature or characterizing of the object is written into file as it is created. Step 64 stops reading when a read frequency is present and step 66 stops the program. Once information is entered into file at step 62, subsequent processing can be used to generate a signature or characterize the object such as the resonant magnitudes, the sum of resonant magnitudes, the difference resonant magnitudes, or other manipulations of the multiple channel multiple frequency measurement which is used to perform the unique signature of the object. The magnitude of the outputs at each sensor location for each resonance frequency is compared.

What is claimed is:

1. A method for characterizing an object by resonant ultrasound spectroscopy, comprising the steps of:
   (a) applying to said object acoustic waves having different frequencies within a predetermined frequency range wherein the step of applying the acoustic waves comprises:
   defining a small response time interval;
   defining a frequency step interval;
   sweeping said acoustic waves frequency in step intervals through said predetermined frequency range; and
   wherein the duration of each frequency of said waves is said small time interval;
   (b) detecting at least one resonant response of said object to said acoustic waves at a plurality of locations spaced from one another;
   (c) determining frequency and magnitude of at least one response in said predetermined frequency range for each of said plurality of locations;
   (d) recording frequency and magnitude of at least one response from at least two locations from step (b) above; and
   (e) characterizing said object by analysis of said frequency and magnitude of at least one response.

2. The method in accordance with claim 1, wherein said detecting step comprises sensing said magnitude and frequency with ultrasound sensors in contact with said object.

3. The method in accordance with claim 2, further comprising the step of comparing the magnitude of the outputs at each sensor location at each resonance frequency.

4. A method in accordance with claim 1, further comprising the step of forming a unique signature of said object from the magnitude and frequency of at least one resonant response determined at a plurality of locations.

5. A method in accordance with claim 1, wherein said step of applying acoustic vibrations in a predetermined frequency range includes a pause for ring delay at each of said different frequencies.

6. A method for characterizing an object by resonant ultrasound spectroscopy, comprising the steps of:
   (a) applying to said object acoustic vibrations having different frequencies within a predetermined frequency range where in the step of applying includes a pause for ring delay at each of said different frequencies;
   (b) detecting at least one resonant response of said object to said acoustic vibrations at a plurality of locations spaced from one another;
   (c) determining the frequency magnitude of at least one response in said predetermined frequency range for each of said plurality of locations;
   (d) recording the frequency and magnitude of at least one response from at least two locations from step (b) above; and
   (e) characterizing said object by analysis of at least one of said responses.

* * * * *